United States Patent Office 3,448,090
Patented June 3, 1969

3,448,090
METHOD FOR PREPARING COPOLYMERS OF SULFUR DIOXIDE AND A VINYL AROMATIC COMPOUND
Georgette Steinbach-Van Gaver, Paris, France, assignor to Produits Chimiques Pechiney-Saint-Gobain, Paris, France
No Drawing. Filed Nov. 12, 1965, Ser. No. 513,144
Claims priority, application France, Nov. 17, 1964, 995,232
Int. Cl. C08g 25/00
U.S. Cl. 260—79.3                              5 Claims

ABSTRACT OF THE DISCLOSURE

The invention is concerned with the method for the preparation of copolymers of $SO_2$ and a vinyl aromatic compound such as styrene with or without another polymerizable unsaturated monomer such as acrylonitrile in which the copolymerization reaction is carried out at a temperature below 100° C. in the presence of a catalyst and in which the improvement comprises the copolymerization of the materials in the presence of a compound selected from the group consisting of an aliphatic organic compound of a non-metal in Groups VI and VII of the Periodic Table, such as a mercaptan or thioether having the formula R—SH and R—S—R in which R is an alkyl group having from 3 to 20 carbon atoms and preferably 10 to 20 carbon atoms, or an organic halogenated compound such as allyl bromide.

---

This invention relates to novel thermoplastic compositions of matter and to novel methods of making them. The compositions are copolymers of $SO_2$ and various vinyl benzenes.

Copolymers of $SO_2$ and styrene are known but their thermal stability is poor at their softening temperatures, which limits their use for molding and other shaping.

It is an object of this invention to prepare novel thermoplasts which are copolymers of $SO_2$ and various vinyl benzenes, which have satisfactory thermal stability at their softening temperatures. It is also an object to enlarge the field of uses of such polymers.

The objects of the invention are accomplished, generally speaking by copolymers of $SO_2$ and at least one vinyl benzene which are thermally stable at their softening temperatures, and which have a mean molecular mass in the range between about 200,000 and about 1,000,000; and by a method of preparing a copolymer of $SO_2$ and a vinyl aromatic compound which comprises mingling $SO_2$, the vinyl aromatic compound, and at least one of a group consisting of the compounds of nonmetals of the VI and VII groups of the Periodic Table with aliphatic organic compounds and of halogenated aliphatic compounds, under conditions of time, temperature, pressure, and catalysis favorable to polymerization, and flocculating and removing the copolymer.

In the practice of the invention the mixed monomers are polymerized in the presence of a compound of a metalloid (nonmetal) of the VI and VII groups of the Periodic Table with an aliphatic radical which may be halogenated, of which allyl bromide and the organic, higher aliphatic derivatives of sulfur are indicated.

The higher aliphatic mercaptans, especially those of 10 to 20 C atoms in the aliphatic radical are preferred. Lauryl mercaptan and tertiododecyl mercaptan exemplify the group and are somewhat superior. Of the halides allyl bromide is so far superior as to be considered unique for general purposes.

Exemplary of the organic sulfur compounds are those having the formula R—SH (mercaptans) and those having the formula R—S—R, each R being alkyl of 3 to 20 atoms. It is good practice to use enough sulfur compound to establish a molar proportion to the vinyl benzene between about .01 to about 3%.

The halogenated aliphatic hydrocarbons used may favorably be bromine compounds such as allyl bromide, the molar proportion to the vinyl benzene being in the range about .05 to about 5%.

Among the vinyl benzenes employed, representative members are styrene, meta and para vinyltoluene, and vinyl xylene.

Other monomers compatible with $SO_2$ and the vinyl benzenes may be copolymerized with them, for instance acrylonitrile.

In mingling the monomers various percentages of the main ingredients may be employed; in this description, in order to show the effect of variants of the method, the proportion of $SO_2$ introduced into the polymer has been kept at about .5. In order to achieve this an excess of $SO_2$ has been put into the reaction chamber, the excess being on the order of 50% of the total quantity of $SO_2$ employed.

The conditions of polymerization as to temperature, pressure, medium and catalysis do not differ from the better practice of the prior art. A catalyst is usually employed, e.g., oxidizing catalysts such as the organic peroxides, percarbonates, mineral peroxides, and ammonium nitrate.

The temperature should be below about 100° C. and, while it is chosen with respect to the vinyl compound used it is usually between 40 and 50%, which are preferred because above 50° C. the content of $SO_2$ in the polymer tends to be reduced. The polymerization is continued to a suitable end point which, at 50° C. is about 6–8 hours in many cases.

The new copolymers have improved thermal stability at their softening temperatures and their softening temperatures are less than polymers made from like ingredients in the prior art. Because of these superior properties they can be molded, extruded, and otherwise shaped without degradation, and their field of use is greatly enlarged.

The following examples illustrate the invention without limiting the generalities elsewhere herein stated:

EXAMPLE 1

(Prior art practice)

A one litre glass autoclave having a mechanical agitator and a heating jacket was used. The air was replaced by nitrogen and it received 400 cc. of water, 9 g. of a 27% solution of ammonium lauroyl sulfate emulsifier, .32 g. of ammonium nitrate catalyst, 104 g. of styrene, and 48 g. of $SO_2$. The mass was heated and agitated at 50° C. for 6 hours, degassed, and the latex was flocculated by heating the latex to 85° C., adding 15 cc. of a 35% solution of $CaCl_2$ and filtered. The filtrate was washed with water until the pH of the effluent was about 5, it was dried at 50° C. in a ventilated oven. There were 120 g. of product or a yield of 88.5% of the styrene employed. The centesimal composition showed a ratio of $SO_2$ to styrene in the copolymer of about .5. The mean molecular mass of the polymer, by light diffusion of a solution in tetrahydrofurane was MW=2,260,000.

This polymer was tested for fluidity in a Grader at temperature rise of 3° C. per minute. The charge in the Grader was 10.463 kg., the diameter of the test piece was 10 mm., that of the piston was 9.8 mm. and the spinning nozzle was 8 mm. long and 2 mm. in diameter. The product flowed at 230° C. and was strongly decomposed. The loss of weight was measured as a function of temperature in a MacBain thermobalance on a test piece of 15 mg. at 235° C. under a current of air of 5 l. per hour. These were 8.8% after an hour, 34.2% after 2 hours, and 47.5% after 3 hours.

EXAMPLE 2

(This invention)

Using the same ingredients and conditions as in Example 1 but including .204 g. of allyl bromide (.15% of the weight of the monomers) in the monomers. The product was subjected to the same test in a grader. It flowed at 210° C. without any decomposition and had a mean molecular mass of 844,000. Its loss of weight at 235° C. was 8.5% at 1 hour, 14.6% at 2 hours, and 22.5% at 3 hours.

EXAMPLE 3

Using the same conditions as Example 2 but with .408 g. of allyl bromide of .3% of the weight of the combined monomers, produced a product which flowed without decomposition at 205° C. in the grader, had a mean molecular mass of 663,000, and a loss of weight of 7.7% in one hour, 15.6% in two hours, and 24.8% in three hours at 235° C.

EXAMPLE 4

Using the process of Example 1 but substituting .272 g. of lauryl mercaptan (.2% of the weight of the monomers), the product flowed at 210° C. without decomposition in the grader, had a mean molecular weight of 735,000, and lost 7.8% of its weight in 1 hour, 28% in 2 hours, and 39.8% in 3 hours at 235° C.

EXAMPLE 5

Operating as in Example 4 but replacing the lauryl mercaptan with .816 g. of tertiododecylmercaptan (.6% of the weight of the monomers) produced a product that flowed at 200° C. in the grader without decomposition, and lost 6.2% of its weight after an hour, 24% at 2 hours, and 40% at 3 hours at 235° C.

EXAMPLE 6

Using the conditions of Example 1 but adding .952 g. of tertiododecylmercaptan and .408 g. of allyl bromide (.7 and .3% of the weight of the reactive monomers respectively) produced a polymer that flowed at 190° C. without degradation, and lost 5.3% of its weight at an hour, 8.6% at 2 hours, and 12.2% at 3 hours at 235° C.

EXAMPLE 7

Into the apparatus described in Example 1 there was introduced successively 400 g. of water, 9 g. of a 27% solution of ammonium lauryl sulfate, .32 g. of ammonium nitrate, 129.8 g. of vinyltoluene, of which 65% was the meta form and 35% the para form, 52.8 g. of $SO_2$, which was 150% of the quantity necessary to form a copolymer including 1 mole of $SO_2$ for 2 moles of vinyltoluene.

The autoclave was heated to 48° C. for 6 hours, cooled, vented, and the latex was flocculated at 85° C. by adding 15 cc. of a 35% solution of $CaCl_2$. The product was washed with water until the effluent had a pH of 4.5 and was dried at 50° C.

154 g. of copolymer was recovered which was 93.4% of the reactive monomers. The average molecular mass was 1,500,000. The ratio of $SO_2$ to vinyltoluene was about 0.5. The polymer was tested in the grader, which flowed at 205° C., without decomposition, as a transparent cylinder. At 215° C. the copolymer lost 4%, 14%, and 27% of its weight after 1, 2, and 3 hours respectively.

EXAMPLE 8

The example was carried out as in Example 7 except that .425 g. of allyl bromide was introduced, being 0.3% of the weight of the reactive monomers. The product was tested in the grader, and flowed without decomposition at 200° C., forming a transparent cylinder. Its mean molecular weight was 736,000. At 215° C. its loss of weight was 2.2% after 1 hour, 3.7% after 2 hours, and 13% after 3 hours.

EXAMPLE 9

The example was carried out as in Example 7 except that .495 g. of tertiododecylmercaptan was admixed with the reaction mass. The product was tested in the grader, flowed at 195° C. without decomposition, and had a mean molecular mass of 296,000. At 215° C. the loss was 2.9% at 1 hour, 5.1% at 2 hours, and 16% at 3 hours.

EXAMPLE 10

Example 7 was repeated except that .425 g. of allyl bromide and .425 g. of tertiododecylmercaptan were added. The product was obtained in the same way and was tested in the grader, flowing at 190° C. without decomposition. Its mean molecular mass (in weight MW) was 229,000. At 215° C. its loss of weight was 1.1% at 1 hour, 1.8% at 2 hours, and 8% at 3 hours.

EXAMPLE 11

Using the apparatus of Example 1 there were introduced 129.8 g. of vinyltoluene, 3.3 g. of acrylonitrile, 52.8 g. of $SO_2$, .33 g. of allyl bromide and .33 g. of tertiododecylmercaptan. Polymerization was continued for 6 hours at 48° C. producing a 91% yield with respect to the reactive monomers of a copolymer having the ratio $SO_2$:vinyltoluene:acrylonitrile of 20.8:77.2:2. The mean molecular mass was 326,000 as compared to a copolymer prepared identically in the absence of allyl bromide and tertiododecylmercaptan which was 545,000. The thermal loss of the new product at 215° C. was 2.2% at 1 hour, 2.7% at 2 hours, and 3.3% at 3 hours.

The material flowed in the grader at 205° C. without decomposition.

EXAMPLE 12

Operating with the same apparatus and in the same aqueous phase as in Example 1 there were introduced 145.2 g. of vinyl xylene 2–4, 52.8 g. of $SO_2$, .54 g. of allyl bromide (.3% by weight). The mean molecular mass of the product obtained was 415,000 whereas that of the copolymer prepared under like conditions but in the absence of allyl bromide was 930,000. The loss of weight at 125° C. was 12% at 1 hour, 27.5% at 2 hours, and 34% at 3 hours. The temperature of extrusion of the product in the grader was 175° C. whereas that of the copolymer without adding allyl bromide was 180° C.

The advantages of the invention include the preparation of novel polymers which are possessed of superior properties. These properties enable the polymers to be shaped and molded without decomposition. The temperatures at which prior art products could be molded or would, if carried to higher temperatures for molding, be subject to substantial degradation.

As many apparently widely different embodiments of the present invention may be made without departing from the spirit and scope thereof, it is to be understood that the invention is not limited to the specific embodiments.

What is claimed is:

1. In a method for the preparation of copolymers of $SO_2$ and a vinyl aromatic compound by copolymerizing a mixture of said compounds at a temperature below 100° C. in the presence of a catalyst, the improvement wherein the copolymerization is carried out in the presence of a compound selected from the group consisting of from 0.01 to 3% by weight of the vinyl aromatic compound of an organic sulfur compound selected from the group consisting of R—SH and R—S—R in which R is an alkyl group having from 3 to 20 carbon atoms, and from 0.05 to 5% by weight of the vinyl aromatic compound of allyl bromide.

2. The method as claimed in claim 1 which includes another compatible unsaturated aliphatic polymerizable monomer as a component for copolymerization with the SO₂ and the vinyl aromatic compound.

3. The method as claimed in claim 2 in which the other compatible unsaturated aliphatic polymerizable monomer is acrylonitrile.

4. The method as claimed in claim 1 in which the vinyl aromatic compound is styrene.

5. The method as claimed in claim 1 in which the ratio of SO₂ to the aromatic component is about one-half.

References Cited

UNITED STATES PATENTS

| | | | |
|---|---|---|---|
| 2,647,879 | 8/1953 | Sibley. | |
| 2,481,596 | 9/1949 | Irany et al. | 260—79.3 |
| 2,677,664 | 5/1953 | Howe | 260—79.3 |
| 2,705,227 | 3/1955 | Stamatoff | 260—79.3 |
| 2,765,295 | 10/1956 | Crouch et al. | 260—79.3 |
| 2,481,596 | 9/1949 | Irany et al. | 260—79.3 |
| 2,637,664 | 5/1953 | Howe | 260—79.3 |
| 2,705,227 | 3/1955 | Stamatoff | 260—79.3 |
| 2,765,295 | 10/1956 | Crouch et al. | 260—79.3 |

OTHER REFERENCES

Barb: "The Copolymerization of Styrene and Sulfur Dioxide," Proc. Royal Soc. (London), 1952, 212A, pp. 66–80.

JAMES A. SEIDLECK, *Primary Examiner.*